United States Patent [19]
Härmälä

[11] 3,765,499
[45] Oct. 16, 1973

[54] WALKING VEHICLES
[76] Inventor: Erkki E. Härmälä, Eura, Finland
[22] Filed: Jan. 6, 1971
[21] Appl. No.: 104,426

[30] Foreign Application Priority Data
Jan. 7, 1970   Finland .................................. 24/70

[52] U.S. Cl. ................................ 180/8 E, 180/8 D
[51] Int. Cl. ............................................. B62d 57/02
[58] Field of Search ..................... 180/8 C, 8 D, 8 E

[56] References Cited
UNITED STATES PATENTS

| | | | |
|---|---|---|---|
| 1,500,723 | 7/1924 | Roy ..................................... | 180/8 E |
| 2,783,847 | 3/1957 | Martinson ........................... | 180/8 D |
| 3,493,064 | 2/1970 | Wilson ................................ | 180/8 C |
| 3,576,225 | 4/1971 | Chambers ........................... | 180/8 G |

FOREIGN PATENTS OR APPLICATIONS

| | | | |
|---|---|---|---|
| 176,890 | 3/1922 | Great Britain ...................... | 180/8 E |

Primary Examiner—Leo Friaglia
Attorney—Tab T. Thein

[57] ABSTRACT

Walking or stepper-type vehicles and more particularly carriages for such vehicles, equipped with a mechanism including one or more pairs of runner members for cyclically moving the vehicle, particularly on terrain which is difficult to travel on, as on soft or marshy earth where wheeled or crawler-type vehicles prove to be useless. The runner members have each a closed guiding slot of the same length and height as the stepping movement, the carriage of the vehicle being associated with a corresponding number of pivotably connected rollers following the slots in the runner members. The invention provides exemplary embodiments with mechanical and hydraulic driving mechanism.

14 Claims, 6 Drawing Figures

PATENTED OCT 16 1973 3,765,499

WALKING VEHICLES

Vehicles provided with a walking or stepper-type wheel substituting mechanism are already known as such, e.g. in carriage structures for some excavators and the like. Such carriages have at least one runner or foot-like member (or a pair thereof) which moves in a vertical longitudinal plane for raising and then moving the carriage forward on the soil by a cyclical movement. The known vehicles of this construction have very complicated and troublesome mechanisms. Moreover the movement in the known constructions is rather jumping and uneven.

The present invention is mainly characterized in that the movement of at least one stepper-type walking member or runner is guided by a member in each runner, having a guiding slot or path of the same length and height as those of the movement of the walking member itself, this guiding slot or slots being situated in the longitudinal vertical plane of the walking member.

At the front and rear ends of each slot are mounted swivelable arms or tongue-shaped levers which guide a transversal pivot or shaft slidably or rotatably mounted in the slot and fastened either on the body of the vehicle or on the runner member itself while said guiding slot is provided accordingly either on the runner or on the body of the vehicle. The pivot or shaft thus moves along said slot (or slots), in clockwise or counterclockwise direction, depending on the desired "walking" direction, and depending on the position to which the arms at the ends of the guiding slot are swiveled.

The invention will now be more fully explained with respect of two exemplary embodiments, also explaining other objects, important features and many of the attendant advantages of the invention, as the same becomes better understood by reference to the following description, when considered with the accompanying drawings, wherein FIG. 1 shows in a somewhat schematic side view one exemplary embodiment of a walking or stepper-type mechanism according to the present invention, adapted to a moving carriage, and provided with a mechanical driving mechanism;

The vehicle provided with a walking or stepper-type wheel substituting mechanism according to the invention comprises a carriage or body 1 (FIGS. 1, 2) and at least one pair of runners or foot members 2 (2' in FIG. 2) on alternate sides, for effecting a "walking" movement, and being mounted to the carriage.

In addition to this there can be one or more firmly attached runners or feet (not shown) on which the carriage rests when the "walking" runners are performing the return movement. There can also be mounted several pairs of longitudinal walking runners which move successively, at different stages, so that the forward motion of the vehicle becomes more continuous and even. This would make firmly mounted runners unnecessary.

Figure 1:
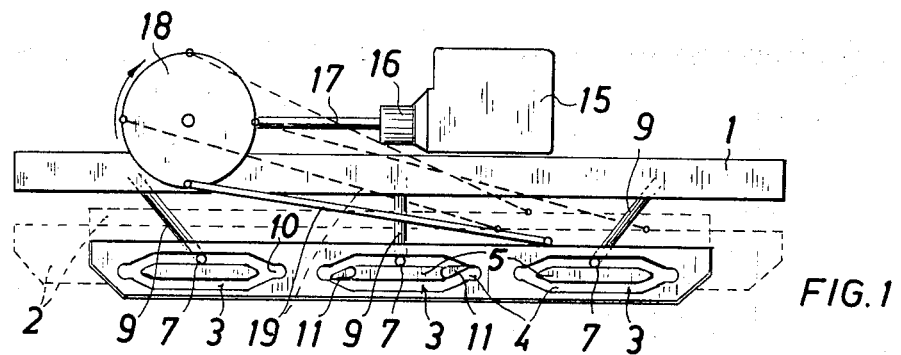
Figure 2:
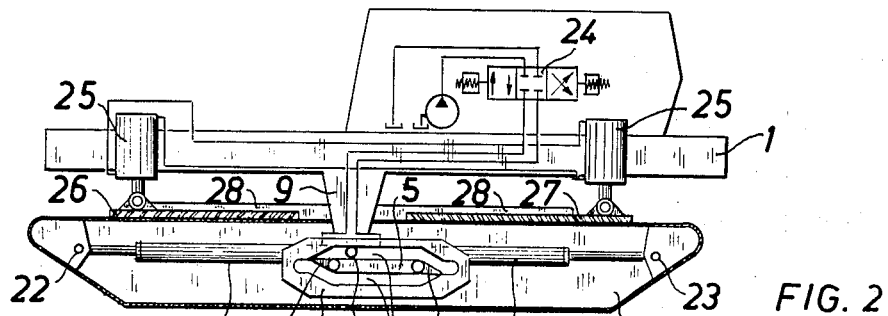
FIG. 2 shows, also somewhat schematically, a side view of another embodiment of the walking mechanism according to the invention, this time fitted with a hydraulic driving mechanism.

In the drawings, and particularly in FIGS. 1, 2, only one pair of runners is shown in side views for the sake of a better understanding of the principles of the invention, which runners are shown in FIG. 1 (from one side) in various (namely four) positions, partly with broken and dot-dash lines.

According to the invention there is mounted a guiding member 3 (FIG. 2) or more members (FIG. 1) for the walking mechanism on runner or correspondingly on body 1. In the examples shown in FIGS. 1, 2, members 3 are mounted on respective runners 2, 2', and a continuous guiding slot or path 4 (see FIGS. 4 and 6) on each member 3 is situated mainly in the same direction as the runner itself, and in a substantially vertical plane.

Figure 6:
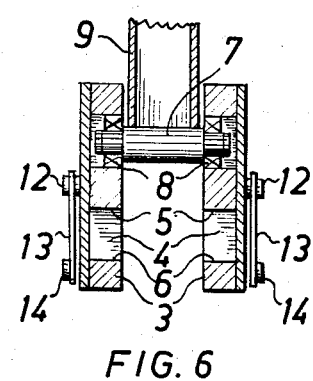
FIG. 6 shows a section of the guiding member along line 6 — 6 of FIG. 4.

Slot 4 is an elongated, closed path limited by hard or hardened (e.g. steel) members having sliding or rolling runways or surfaces 5, 6 (see FIGS. 1, 2, 4, 6). Guiding members 3 are preferably arranged to form a pair (FIGS. 3, 6). Rollers 8 mounted on pivots 7 are adapted to roll in slots 4. Pivots 7 are fastened to carriage 1 by means of a bearing or supporting arm or member 9 (in FIG. 2), or two or more members 9 (in FIG. 1).

In the ends of slots 4 there are provided gaps or recesses 10 in which rollers 8 on pivots 7 are allowed sufficient space, at the end positions of the movement of the runner 2, 2', when the direction of the movement changes, e.g. when roller 8 moves in the lower part of slot 4 during the return movement of the runner. Consequently the latter moves during that time at a raised level and does not touch the soil.

Figures 3, 4:
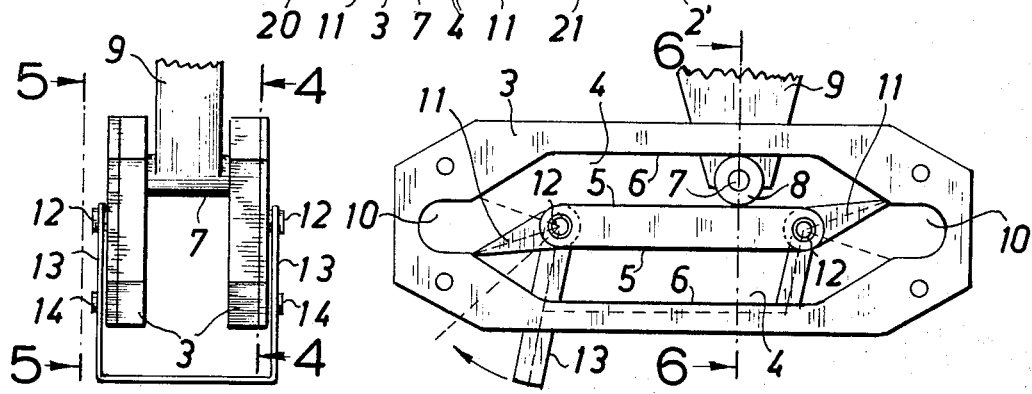
FIG. 3 is a front view of a guiding member for the walking movement.
FIG. 4 shows a side view of the guiding member of FIG. 3 along section line 4 — 4 of the latter.

Rollers 8 are guided in each member 3 from the upper part of slot 4 to its lower part, or conversely, by means of pairs of spring-loaded guiding tongues or tongue-shaped levers 11. In FIG. 4, lever 11 on the right-hand side bears against the upper part of slot 4 whereas lever 11 on the left-hand side touches the lower part of the slot. When guiding member 3 together with runner 2, 2' is brought into reciprocal motion, roller 8 in guiding slot 4 makes a clockwise relative motion. This means that the walking vehicle moves from left to right, considering the illustration of FIG. 4.

It will be understood by those skilled in the art that right-end tongue 11, as shown in the solid-line position in FIG. 4, when engaged by the advancing roller 8, is caused to pivot to touch the lower part of the slot 4 (see the broken axial line for the tongue in the new position), but only temporarily, during engagement with the roller, as the latter advances over tongue 11 into the right-hand recess 10, the tongue functioning temporarily as a ramp, and is then biased back to the solid-line position.

Roller 8, as it moves clockwise from the upper part of slot 4 into recess 10, and thence into the lower slot part, acts to raise runner 2 (relative to body 1) off the ground, e.g. to one of the intermediate dot-dash-line positions mentioned earlier for FIG. 1, and thence to the upper broken-line position for advancement of the runner relative to the body.

After roller 8 has traversed the lower part of slot 4 during its advancement (still with a clockwise relative motion), it temporarily pivots the left-end tongue 11 out of its way, as it moves into the left-hand recess 10.

This tongue is also spring-biased towards the solid-line position, similarly acting as a ramp for the roller's return into the upper part of slot 4.

During this phase of the roller movement, it causes the runner 2 to drop down to the other intermediate position, and thence to the ground-engaging position (solid-line showing in FIG. 1), for subsequent advancement of the vehicle during the roller's traverse of the upper part of slot 4.

The position of tongues 11 can be changed so that the left-hand side tongue is directed upwards and the right-hand tongue downwards. This changes the moving direction of the vehicle. The position of tongues 11 is changed by means of arms 13 (see FIGS. 3 to 6) which are fastened to shafts 12, said arms being interconnected by means of a link or rod 14.

Figure 5:
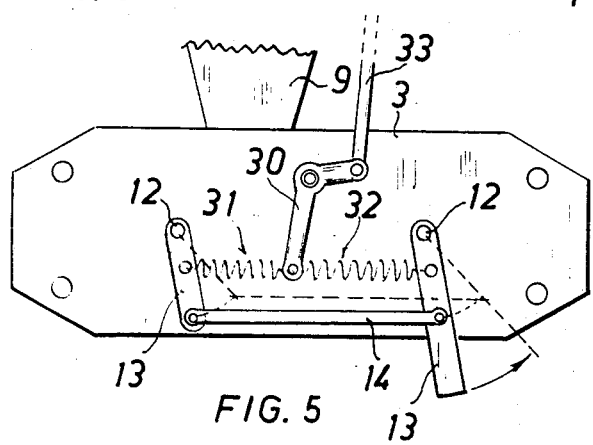
FIG. 5 is the guiding member as seen in FIG. 3 in a side view, from the direction of line 5 — 5.

Several kinds of spring-biasing means can be connected with the arms 13 or the shafts 12 for controlling the positions of the tongues 11. FIG. 5 shows an exemplary manner in which this can be accomplished. On guiding member 3, between arms 13, is swingably attached a lever 30. One end of the latter is connected between two springs, 31 and 32, as shown, which are in turn connected with the respective arms 13. The other end of lever 30 is connected with a drawing rod 33, the other end of which is within the reach of the operator of the vehicle.

Another possible solution would be, as will be readily understood by those skilled in the art, to mount torsional springs (not shown) on shafts 12 of tongues or levers 11, the springs being so connected between levers 11 and arms 13 that they will cause the biasing of each tongue or lever against the respective upper or lower edge of slot 4, at the juncture points with the respective recesses 10, depending on the corresponding setting angle of arms 13.

When springs 31, 32 bias the arms 13 in either direction, the latter and tongues 11, which are connected therewith, are correspondingly swiveled. The biasing of arms 13 of course urges levers 11 against the respective outer wall portions of slot 4, into respective operative positions.

Guiding members 3 are attached on the pair of runners 2, 2' preferably in pairs, two or more pairs, each pair comprising two adjacently mounted members 3. When runners 2 are provided with three successive pairs of guiding members 3, as shown in FIG. 1, it is sufficient to provide said guiding tongues 11 only on one pair of them, as shown.

The drive of the vehicle according to the invention can be effected either mechanically or hydraulically, whereby the driving mechanism reciprocally moves the runners and the before-described guiding members 3, altering the reciprocal movement in accordance with the form of guiding slot 4.

In FIG. 1 is shown the inventive principle of a mechanical drive where carriage 1 has a (schematically shown) driving motor 15 which rotates a driving shaft 17 through a gearing 16 and further through a bevel gearing (not shown in the illustration) and a cam wheel or eccentric 18. The latter, by means of a connecting rod 19, moves runner 2 forwards and backwards. In FIG. 1 the runner 2, in its initial position, is drawn with solid lines, and connecting rod 19 in the corresponding position. The respective broken and dot-dash lines show runner 2 as well as rod 19 in two other angular positions at stages displaced by 90°.

In FIG. 2 there is shown an alternative example, the application of a hydraulic drive to the vehicle according to the invention. The alternative runner 2' is driven by two hydraulic cylinders 20, 21, one (the inner) end being attached to pivot 7 at the end of bearing arm 9 while the other (the outer) ends are attached to articulation points 22, 23 at respective ends of runner 2'. The reciprocal motion is effected in a known manner by directing oil flow, e.g., by means of a magnetic valve 24, alternately from one cylinder to the other.

Limit switches acting on valve 24 can be mounted on the runner or runners at suitable locations, preferably on the upper surface thereof.

The hydraulic drive shown in FIG. 2 has, as a matter of example, two single-acting cylinders 20, 21. The use of only one, double-acting cylinder is also possible at which time the unloaded return movement is easily made considerably faster than the actaul working or forward movement. The volume of the cylinder can be made much smaller on the piston-rod side than on the other side. Thus the velocity of the piston would become faster when the oil streams into the piston-rod side than into the opposite side.

The arrangement shown in FIG. 2 uses only one pair of guiding members 3. In order that runner 2' can maintain its direction, it is connected to carriage 1 at the front and rear ends by means of two double-acting, vertically mounted hydraulic cylinders 25, the latter being connected in series in such a way that the cylinder space above the piston in one cylinder is connected with the space below the piston in the other cylinder and vice versa, as shown somewhat schematically by the connecting hydraulic lines. This coupling makes possible that the height difference between carriage 1 and runner 2' can be altered within the limits of the stroke length of cylinders 25, determined by guiding member 3, but the parallelity of the carriage and the runner will be maintained at all times. The effect is based on the fact that the combined volumes of the interconnected cylinder spaces are constant and that liquids such as hydraulic oils are practically incompressible. Cylinders 25 have thus no power source but they only maintain balance. They are firmly mounted on carriage 1 but toward the pair of runners 2' they are linked with sliding blocks 26, 27 which allow longitudinal sliding movement on runways 28 on said runners during the reciprocal motion of the runners.

The hydraulic system can be realized also in that guiding members are mounted successively or lengthwise as in FIG. 1 in which case the vertically mounted balancing cylinders 25 are unnecessary.

The guiding member or members 3 can be built as a fully closed and compact construction so that lubrication can be easily arranged, such as when the main parts are fully immersed in oil. Thus the effect of friction can be eliminated or decreased to a minimum.

The lower surface of the runners 2, 2' can be provided with teeth, claws or similar soil engaging means (not shown) to obtain better gripping against the soil surface. It is also possible to provide the runners with auxiliary feet (nto shown), either spring-loaded or articulated to the lower surfaces of the runners, particularly when the vehicle is used on uneven and stony soil.

The turning direction of the vehicle is controlled by increasing the speed of the runner on one side and decreasing the same on the other.

The walking or stepper-type carriage of the invention is found particularly suitable for vehicles of light or middle-heavy construction.

It should be understood, of course, that the foregoing disclosure relates only to preferred embodiments of the invention, and that it is intended to cover all changes and modifications of the two examples described which do not constitute departures from the spirit and scope of the invention.

What I claim is:

1. A walking vehicle adapted to marshy and soft soil, comprising, in combination, a body portion; at least one pair of runner members pivotally linked with said body portion on alternate sides thereof; a walking mechanism for imparting said runner members a stepper-type movement, thereby cyclically to move the vehicle, selectively in forward and rearward directions; said mechanism including at least one guiding member mounted in the longitudinal vertical plane of the vehicle, and provided with a continuous guiding slot having substantially the same length and height as the stepper-type movement, and including upper and lower wall portions; two swivelably mounted tongue-shaped levers near the ends of said slot, spring-biased into respective operative positions and to bear against said upper and lower wall portions of the slot; at least one pivotable member, one mounted in each of said runner members, operatively associated with said body portion, and movable along said slot for producing the stepper-type movement; said guiding member being attached to said body portion for cooperation with said pivotable member; said ends of the slot having terminal recesses in which said pivotable member is allowed sufficient space in the end positions of the stepper-type movement; means for producing relative reciprocal movement between said runner members and said guiding member; and adjusting means for said levers, including an angularly attached arm for each lever and a link between said arms, allowing one lever to bear against said upper wall portion of the slot while the other lever touches said lower wall portion thereof, and vice versa, for controlling selective clockwise and anticlockwise movement of said pivotable member in a respective slot portion, and consequently the direction of the stepper-type movement.

2. The walking vehicle as defined in claim 1, futher comprising soil engaging means applied to the lower surfaces of said runner members.

3. The walking vehicle as defined in claim 1, further comprising at least one auxiliary foot member associated with said runner members.

4. The walking vehicle as defined in claim 1, wherein said pivotable member is in the form of a pivoted roller movable in said slot within a path limited by said levers.

5. The walking vehicle as defined in claim 1, wherein said pivotable member is attached to said body portion while said at least one guiding member is mounted in each of said runner members for cooperation with the former.

6. The walking vehicle as defined in claim 5, further comprising at least one pivoted bearing arm fastened to said body portion for supporting said pivotable member.

7. The walking vehicle as defined in claim 5, wherein at least two lengthwise disposed guiding members are mounted in each runner member.

8. The walking vehicle as defined in claim 7, wherein said levers are mounted in said slot of only one of said at least two guiding members in each runner member.

9. The walking vehicle as defined in claim 1, wherein said means for producing reciprocal movement is mechanical and includes drive and gear means supported by said body portion, an eccentric driven by said drive and gear means, and a rod connecting said eccentric with said runner members for controlled reciprocation of the latter.

10. The walking vehicle as defined in claim 1, wherein said means for producing reciprocal movement is hydraulic and includes hydraulic supply and control means supported by said body portion, and a pair of double-acting hydraulic cylinders operated by said supply and control means and selectively actuatable and operatively connected with said pivotable member for controlled reciprocation of said runner members.

11. The walking vehicle as defined in claim 10, wherein the outer ends of said cylinders are articulated to respective end portions of said runner members.

12. The walking vehicle as defined in claim 10, further comprising a second pair of double-acting hydraulic cylinders supported by said body portion and supporting said runner members with a freedom of movement.

13. The walking vehicle as defined in claim 12, wherein said runner members are provided with lengthwise runways slidably engageable by the outer ends of said second cylinders, further comprising sliding blocks interposed between said outer ends and said runways.

14. The walking vehicle as defined in claim 12, wherein said first-named cylinders have a closed serial connection without extraneous power supply so that the upper space of one cylinder is connected with the lower space of the other, and vice versa, for maintaining parallelity between said body portion and said runner members while allowing for adjustment of their height difference.

* * * * *